United States Patent Office 3,721,714
Patented Mar. 20, 1973

3,721,714
DECOMPOSITION OF CARBONATES TO FORM ALDEHYDES
Donald M. Fenton, Anaheim, Calif., assignor to Union Oil Company of California, Los Angeles, Calif.
No Drawing. Filed Dec. 23, 1968, Ser. No. 786,426
Int. Cl. C07c 45/00
U.S. Cl. 260—601 R
11 Claims

ABSTRACT OF THE DISCLOSURE

A process for the preparation of aldehydes and alcohols comprising contacting a dicarbohydryl carbonate with a catalyst comprising a complex of a Group VIII noble metal and a biphyllic ligand at a temperature between 150° C. and 250° C. and at a pressure sufficient to maintain liquid phase reaction conditions. The aldehyde and alcohol products produced are useful as intermediates for a variety of products including plasticizers, acids and resins, etc.

---

The invention relates to a process for preparing alcohols and aldehydes by the decomposition of dicarbohydryl carbonates. The invention comprises decomposing a dicarbohydryl carbonate, e.g., dibutyl carbonate

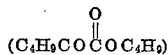

by contacting the carbonate with a Group VIII noble metal catalyst in complex with a biphyllic ligand (e.g., triphenylphosphine) to form the corresponding aldehyde (e.g., butyraldehyde) and alcohol (e.g., butanol) in high yields and at relatively mild reaction conditions. The reaction proceeds according to the following equation:

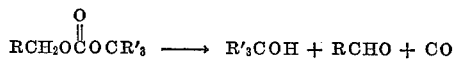

The carbonates are by-products in the oxidative carbonylation of olefins to esters of alpha, beta-unsaturated acids and/or beta-acyloxo substituted carboxylic acids. The aldehydes and alcohols are in general more useful and more valuable than the carbonates and hence the process of the invention can be used to convert the by-product carbonates to useful aldehydes and alcohols.

In addition, an aldehyde may be prepared by reacting an alcohol with phosgene (COCl$_2$) to obtain the carbonate which, using the process of the invention herein, can be decomposed to the product aldehyde. Alcohols are presently oxidized to aldehydes, often with the formation of undesired acids and tar products. The process of this invention can be used to convert an alcohol to an aldehyde without oxidation and thereby obviates formation of oxidation by-products inherent in the prior art processes.

The dicarbohydryl carbonates that can be converted by the process of this invention have from 3 to about 25 carbons and have the following general formula:

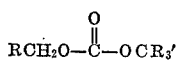

wherein R and R' are hydrogen or the same or different alkyl, alkenyl, aryl, alkaryl, cycloalkyl, or cycloalkenyl having 1 to about 20 carbons and preferably having 1 to about 12 carbons.

Examples of the above radicals are methyl, hexyl, nonyl, tridecyl, octadecyl, pentenyl, octenyl, nonenyl, octadecenyl, phenyl, tolyl, pseudocumenyl, xylyl, tetramethylphenyl, cyclopropyl, cyclooctyl, cyclopentenyl, and cyclononenyl. Preferably R and R' are lower alkyl, e.g., methyl, ethyl, propyl, butyl, pentyl, hexyl, heptyl, octyl, etc., preferably having 1 to about 12 carbons and preferably RCH$_2$ and R$_3$' are the same. Suitable carbonates include dimethyl carbonate, diethyl carbonate, dipropyl carbonate, dibutyl carbonate, diisobutyl carbonate, dipentyl carbonate, di-2-methylpentyl carbonate, diheptyl carbonate, butyl ethyl carbonate, octyl cyclohexyl carbonate, dioctyl carbonate, didecyl carbonate, didodecyl carbonate, dibutenyl carbonate, propyl pentenyl carbonate, dinonenyl carbonate, dibenzyl carbonate, di-β-phenethyl carbonate, butyl benzyl carbonate, dicyclobutyl carbonate, dicyclohexyl carbonate, dicyclononyl carbonate, dicyclohexenyl carbonate, dicyclononenyl, etc.

The product aldehyde and alcohol correspond to the carbonate reactant and generally are produced in a 1 to 1 ratio. For example, when dioctyl carbonate is decomposed octanal and octanol are obtained and when dibenzyl carbonate is decomposed benzaldehyde and benzyl alcohol are formed.

The catalyst of the invention comprises a Group VIII noble metal in complex with a biphyllic ligand. The biphyllic ligand is a compound having at least one atom with a pair of electrons capable of forming a coordinate covalent bond with a metal atom and simultaneously having the ability to accept the electron from the metal, thereby imparting additional stability to the resulting complex. Biphyllic ligands can comprice organic compounds having at least about 3 carbons and containing arsenic, antimony, phosphorus or bismuth in a trivalent state. Of these the phosphorus compounds, i.e., the phosphines, are preferred; however, the arsines, stibines and bismuthines can also be employed. In general these biphyllic ligands have the following structure:

$$E(R'')_3$$

wherein E is trivalent phosphorus, arsenic, antimony or bismuth; and
wherein R'' is the same or different alkyl, cycloalkyl, or aryl having 1 to about 18 carbons; examples of which are methyl, butyl, nonyl, cyclohexyl, cyclodecyl, phenyl, tolyl, xylyl, tetramethylphenyl, etc. Preferably at least one R'' is aryl e.g., phenyl, tolyl, xylyl, etc. having 6 to 9 carbons and, most preferably, the ligand is triaryl.

Examples of suitable biphyllic ligands having the aforementioned structure and useful in my invention to stabilize the catalyst composition are the following: trimethylphosphine, triethylarsine, triethylbismutine, triisopropylstibine, dioctylcycloheptylphosphine, tricyclohexylphosphine, ethyldiisopropylstibine, tricyclohexylphosphine, methyldiphenylphosphine, methyldiphenylstibine, triphenylphosphine, triphenylbismuthine, tri(o-tolyl)phosphine, phenyldiisopropylphosphine, phenyldiamylphosphine, ethyldiphenylphosphine, phenylditolylphosphine, xylyldiphenylarsine, tolyldi(m-xylyl)stibine, trixylylphosphine, trixylyarsine, trixylylstibine, cyclopentyldixylylstibne, dioctylphenylphosphine, tridurylphosphine, trixylylbismuthine, etc. Of the aforementioned, the aryl phosphines and particularly the triarylphosphines (e.g., triphenylphosphine) are preferred because of their greater activity.

The Group VIII noble metal may be ruthenium, rhodium, palladium, osmium, iridium, or platinum. A catalytic quantity of the metal is added (e.g., 0.002–2% of the reaction medium) and the metal may be added as a soluble salt, a carbonyl, a hydride or as a chelate.

The Group VIII metal may be complexed with the abovedescribed biphyllic ligand before being introduced into the reaction medium or the complex may be formed "in situ" by simply adding a compound of the metal and the biphyllic ligand directly into the reaction medium. In either case, it is generally preferable that the quantity of biphyllic ligand be in excess (e.g., 10–300%) of that stoichiometrically required to form a complex with the Group VIII metal. The complex has from 1 to about 5 moles of biphyllic ligand per atom of the metal and other components such as hydride, or soluble anions such as sulfate, nitrate, $C_1$-$C_5$ carboxylates (e.g., acetate, propionate, isobutyrate, valerate, etc.), halide, etc. may be but need not be included in the complex catalyst of this invention. These components may be incorporated in the catalyst by the formation of the catalyst complex from a Group VIII metal salt of the indicated anions.

Examples of suitable sources of the noble metals are as follows: iridium carbonyl chloride, iridium carbonyl hydride, iridium carbonyl, iridium tetrabromide, iridium tribromide, iridum trfluorde, iridium trichloride, osmium trichloride, chloroosmic acid, palladium hydride, palladous chloride, palladous cyanide,, palladous iodide, osmium isopropionate, iridium valerate, palladium acetate, palladous nitrate, platinic acid, platinous iodide, palladium cyanide, sodum hexachloroplatinate, potassium trichloroethylene) platinate(II), chloropentaamminorhodium(III) chloride, rhodium dicarbonyl chloride dimer, rhodium nitrate, rhodium trichloride, rhodium carbonyl hydride, ruthenium trichloride, tetraamminorutheniumhydroxychloro chloride; etc.

The reaction is performed under liquid phase conditions and may be performed in a liquid organic solvent (i.e., has a solvency for the reactants and the catalyst) inert to the reactants, products and to the reaction conditions. Suitable solvents include, for example, hydrocarbons, ketones, alkanoic acid anhydrides, and ethers. Examples of the foregoing are pentane, hexane, heptane, isooctane, naphtha, cyclohexane, indane, benzene, toluene, xylene, tetralin, acetone, diethyl ketone, diisopropyl ketone, methyl-n-amyl ketone, cyclohexanone, di-isopropyl ether, di-n-butyl ether, ethylene glycol di-iso-butyl ether, methyl o-tolyl ether, diethyl ether, acetic anhydride, propionic anhydride, butanoic anhydride, pentanoic anhydride, etc. Preferably, however, the reaction is conducted in the absence of a solvent in which case the reaction can be conducted such that a substantial amount of the carbonate reactant may be present by, for example, in the batch process, terminating the reaction prior to most of the carbonate being decomposed, or for example in the continuous process, adding sufficient carbonate into the contacting zone to maintain the required carbonate level.

The reaction is performed at relatively low temperatures, e.g., 100° to 400° C. and preferably 150° to 250° C. and at low pressures, e.g., 1 to 30 atmospheres, preferably 4 to 10 atmospheres (the pressures herein being an "absolute" basis as opposed to a "gauge" basis) and sufficient to maintain liquid reaction conditions. The decomposition releases gaseous carbon monoxide and therefore lower pressures, in addition to higher temperatures, favor the decomposition. Hence, the reaction is preferably performed at the lowest pressure required to maintain liquid phase at the reaction temperature and the optimization of the rate of decomposition involves correlating temperature and pressure in a conventional manner. The gas phase can comprise chiefly the generated carbon monoxide, however, an inert gas such as nitrogen may also be introduced into the reaction zone in order to provide the necessary pressure and to reduce the partial pressure of carbon monoxide to a low value, e.g., from 0.1 to 50 percent of the total pressure. The necessary heat can be supplied by circulating part of the medium through a heater in indirect heat exchange with steam or with other suitable heating fluids.

The addition of certain anhydrous, organic sulfonic acids to the reaction medium generally improves the rate of decomposition of the carbonate and the yield of aldehyde. Aliphatic and aromatic sulfonic acids having at most about 10 carbons, such as methanesulfonic acid, ethanesulonfic acid, propanesulfonic acid, butanesulfonic acid, etc., benzenesulfonic acid, toluenesulfonic acid, xylenesulfonic acid, cumenesulfonic acid, naphthalenesulfonic acid, etc. are suitable anhydrous organic sulfonic acids. The acid is added in catalytic quantities, e.g., 0.005 to 5% of the reaction medium.

The reaction may be carried out in a "batch" or in a continuous process. In the batch process, the reaction is continued until a substantial amount or all of the carbonate has decomposed with the excess carbon monoxide being vented to the atmosphere. The products, reactant carbonate, catalyst and solvent, if any, are separated by conventional means (e.g., distillation). In the continuous process, carbonate is continuously fed into the reaction zone, the carbon monoxide vented and a slip stream of the reactant, products, catalyst and solvent, if any, is continuously withdrawn and separated by distillation. The reactant, catalyst and solvent, if any, are then recycled to the reaction zone.

The following examples will serve to illustrate the practice of the invention, however, the invention should not be limited to the processes described therein:

EXAMPLE 1

To a bomb were introduced 50 grams of dibutyl carbonate, 1 gram of palladium chloride bis(triphenyl)phosphine, and 2 grams of triphenylphosphine. Nitrogen was introduced into the bomb to a pressure of about 8 atmospheres and the bomb was heated to and maintained at 200° C. for 4 hours. The bomb was then cooled, depressured and opened. The products were analyzed by gas chromatography to reveal that 0.4 gram of butyraldehyde and 0.3 gram of butanol were formed in the process.

When the reaction is repeated in the pressure of 150 milliliters benzene as an inert reaction solvent, similar results are obtained.

EXAMPLE 2

To a bomb were introduced 50 grams of dibutyl carbonate, 1 gram of palladium chloride bis(triphenyl)phosphine, 2 grams of triphenylphosphine and 50 milliliters of acetic anhydride. Nitrogen was introduced into the bomb to a pressure of about 8 atmospheres and the bomb was heated to and maintained at 200° C. for 4 hours. The bomb was then cooled, depressured and opened. The products were analyzed by gas chromatography to reveal that 1.5 grams of butyraldehyde were formed.

EXAMPLE 3

To a 250 milliliter round bottom flask were introduced 45 milliliters of dibutyl carbonate, 0.5 gram of palladium iodide, 1.0 gram of p-toluene sulfonic acid hydrate and 3.0 grams of triphenylphosphine. The flask was equipped with a Dean-Stark tube and the mixture was heated to reflux for about 1 hour. About 7 milliliters of liquid products were distilled and, by gas chromatography analysis, 60% of the liquid was identified as butanol and 20% was identified as butryaldehyde.

The preceding examples illustrate the best mode of practice of the invention presently contemplated. Other carbonates, solvents or catalyst complexes described hereinabove can readily be substituted for those illustrated without substantial changes to the illustrated mode of practice.

I claim:

1. The process of decomposing a dicarbohydryl carbonate to form an aldehyde comprising contacting a carbonate having from 3 to 25 carbons and having the formula:

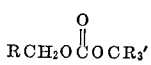

wherein R and R' are hydrogen or the same or different alkyl, aryl, alkaryl, or cycloalkyl having 1 to about 12 carbons;

with palladium in complex with a biphyllic ligand having the formula:

wherein E is trivalent phosphorus, arsenic, antimony or bismuth; and wherein each R″ is the same or different alkyl, cycloalkyl or aryl having 1 to about 12 carbons, at a temperature between about 100° and 400° C. and at a pressure sufficient to maintain liquid phase reaction conditions.

2. The process of claim 1 wherein the biphyllic ligand is a triarylphosphine and wherein R″ has 6 to about 9 carbons.

3. The process of claim 3 wherein said ligand is triphenylphosphine.

4. The process of claim 1 wherein the carbonate is a symmetrical, saturated, alkyl carbonate having from 8 to about 25 carbons.

5. The process of claim 4 wherein the reaction medium includes a minor portion of an alkyl, aryl or alkaryl sulfonic acid having at most about 10 carbons.

6. The process of claim 3 wherein the carbonate is dibutyl carbonate.

7. The process of claim 3 wherein the carbonate is a symmetrical, saturated, aliphatic carbonate having from 3 to about 25 carbons.

8. The process of claim 1 wherein said contacting is effected in the presence of an inert liquid solvent for said carbonate and palladium complex.

9. The process of claim 1 wherein said temperature is maintained between about 150° and 250° C.

10. The process of claim 1 wherein said pressure is maintained between 4 and 10 atmospheres.

11. The process of claim 9 wherein said sulfonic acid is p-toluene sulfonic acid.

References Cited

UNITED STATES PATENTS 3,487,059  12/1969  Tyran _____ 260—87.3

OTHER REFERENCES

Tsuji et al., JACS 90: 94–98, January 1968.

Schubert et al. in The Chem. of the Carbonyl Group, pp. 695–703, 1966.

LEON ZITVER, Primary Examiner

R. H. LILES, Assistant Examiner

U.S. Cl. X.R.

260—598, 599, 617 R, 618 R, 395, 638 R, 463